United States Patent
Satou

(10) Patent No.: US 6,814,784 B2
(45) Date of Patent: Nov. 9, 2004

(54) METHOD OF HANDLING DIESEL PARTICULATE FILTER

(75) Inventor: Fumihide Satou, Oyama (JP)

(73) Assignee: Komatsu Ltd., Tokyo (JP)

( * ) Notice: Subject to any disclaimer, the term of this patent is extended or adjusted under 35 U.S.C. 154(b) by 35 days.

(21) Appl. No.: 10/271,596

(22) Filed: Oct. 17, 2002

(65) Prior Publication Data

US 2003/0079605 A1 May 1, 2003

(30) Foreign Application Priority Data

Oct. 25, 2001 (JP) .......... 2001-327845

(51) Int. Cl.$^7$ .......... B01D 46/00
(52) U.S. Cl. .......... 95/278; 95/25; 95/273; 55/385.3; 55/523; 55/DIG. 30; 96/417; 60/311
(58) Field of Search .......... 95/273, 278, 279, 95/280, 281, 282, 19, 23, 25; 96/233, 417, 421, 422; 55/282, 385.3, 523, DIG. 30; 60/311; 134/20, 22.12, 22.18, 39

(56) References Cited

U.S. PATENT DOCUMENTS

| | | | | |
|---|---|---|---|---|
| 4,899,540 A | * | 2/1990 | Wagner et al. | 55/DIG. 30 |
| 5,087,272 A | * | 2/1992 | Nixdorf | 95/278 |
| 5,394,692 A | * | 3/1995 | Teuber-Ernst | 55/DIG. 30 |
| 5,833,766 A | * | 11/1998 | Osterwald et al. | 134/22.12 |
| 6,576,579 B2 | * | 6/2003 | Merkel | 55/DIG. 30 |

* cited by examiner

*Primary Examiner*—Duane Smith
*Assistant Examiner*—Jason M. Greene
(74) *Attorney, Agent, or Firm*—Varndell & Varndell, PLLC

(57) ABSTRACT

To provide a method of handling DPF capable of ensuring an expected value of a catching function of reclaimed DPF and eliminating waste of useful metals included by DPF, DPF(1) mounted to a diesel engine for catching PM included in exhaust is reclaimed until being brought into a nonreusable state and remounted to the engine by at least once and in remounting, the DPF(1) is mounted such that the DPF(1) is mounted in the direction reverse to a direction of mounting at a preceding time.

6 Claims, 4 Drawing Sheets

METHOD OF HANDLING DIESEL PARTICULATE FILTER

BACKGROUND OF THE INVENTION

1. Field of the Invention

The present invention relates to a method of handling a diesel particulate filter.

2. Description of the Related Art

Exhaust gas (hereinafter, simply referred to as "exhaust") of a diesel engine includes a large amount of granular matters when an air cleaner is clogged and when the engine is in rapid acceleration. The granular matters are constituted by C (free carbon by incomplete combustion, so-to-speak black smoke or soot) and SOF (Soluble Organic Fraction: uncombusted portion of diesel fuel and lubricant) both of which are pollution causing matters. Hence, there is an engine mounted with a filter for removing diesel particulate at an exhaust pipe of the engine for removing the granular matters from exhaust. Further, the granular matters are so-to-speak PM (Particulate Matters: hereinafter, simply referred to as "PM"). Further, the filter for removing diesel particulate is so-to-speak DPF (diesel particulate filter: hereafter, simply referred to as "DPF").

Here, residuary substances produced by combustion of caught PM are deposited on a PM catching face of DPF and therefore, the catching function of DPF is deteriorated. Hence, deteriorated DPF is removed from the engine and washed and remounted to the engine or interchanged by a new article. Unnecessary DPF is scrapped.

Meanwhile, a direction of mounting DPF to the engine is normally determined as can be exemplified in other filters such as a fuel filter, a lubricant filter, a working fluid filter and an air cleaner. Further, DPF is not a simple filter and catcher but includes various kinds of useful noble metals for constituting oxidation catalysts. Therefore, there are the following drawbacks.

(1) A flow rate of exhaust stays the same before and after DPF and therefore, it is preferable to constitute DPF to be able to use revertedly. In this case, even when a reversing type DPF is reclaimed (washed as mentioned above) until DPF cannot be used again and remounted to the engine, the remounting is carried out manually. Therefore, in remounting, the DPF may be mounted in a direction the same as that in mounting the DPF at preceding time by mistake or ignorance. Further, when such an erroneous operation is repeated, the remounted DPF cannot achieve an expected value of the catching function (service life). Further, a time period of making the DPF unreusable is shortened. That is, useful metals are wasted and the effect of using the DPF is halved.

(2) When the DPF is scrapped by interchanging the DPF by a new article although the DPF can be washed and remounted, limited resources are wasted.

(3) It is desired to recover DPF to be scrapped efficiently to thereby recover and reuse useful metals.

SUMMARY OF THE INVENTION

In view of the above-described drawbacks and future perspective, it is an object of the invention to provide a method of handling DPF (Diesel particulate Filter) capable of resolving at least one thereof.

In order to achieve the above-described object, according to an aspect of the invention, there is provided a method of handling a diesel particulate filter wherein the diesel particulate filter mounted to a diesel engine for catching particulate matters included in an exhaust gas is reclaimed until being brought into a nonreusable state and remounted to the engine at least by one time, and in mounting the filter, the filter is mounted such that the filter is mounted in a direction reverse to a direction of mounting the filter at a preceding time.

Further, in remounting DPF, it is preferable to provide a mark indicating a direction of mounting in remounting the filter at a current time to DPF.

Further, it is recommendable that it is determined that the filter is nonreusable by a predetermined number of remounting the same DPF or at least one of predetermined fluid pass resistance and fluid pass flow rate of DPF.

According to the above-described constitution, DPF is mounted revertedly in the direction reverse to the mounting direction at the preceding time at each time of remounting DPF and therefore, an expected value (service life) of a catching function of remounted DPF can be ensured. Further, a time period reaching a nonreusable state of the filter is prolonged. That is, useful metals are not wasted and the effect of using DPF can maximally be achieved. Since the determination of nonreusableness is made clear, DPF to be scrapped can efficiently be recovered and useful metals can be recovered and reused.

DETAILED DESCRIPTION OF THE PREFERRED EMBODIMENTS

Embodiments according to the invention will be explained in reference to FIG. 1 through FIG. 8. First, DPF1 used in the embodiments will be explained in reference to FIG. 2 through FIG. 5. Further, FIG. 2 is a partially sectional perspective view of DPF1, FIG. 3 is a schematic view viewed in Z direction of FIG. 2 and FIG. 3 is a schematic view viewed in X direction of FIG. 2.

Figure 2:
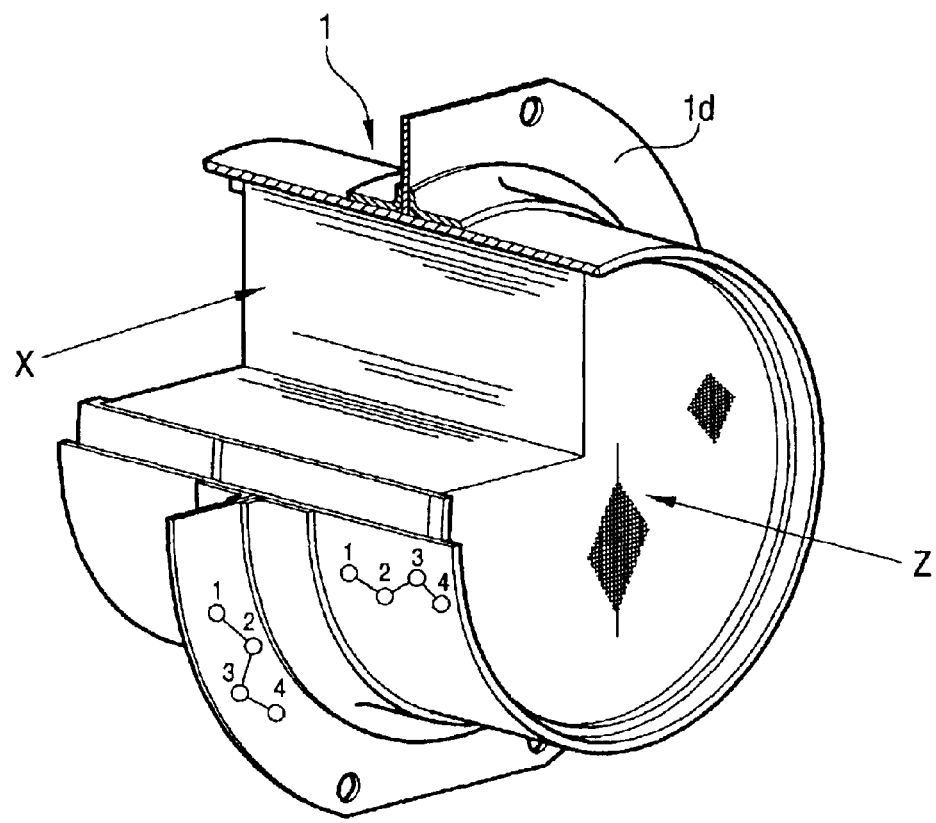
FIG. 2 is a partially sectional perspective view of DPF according to the embodiment.
Figure 3:
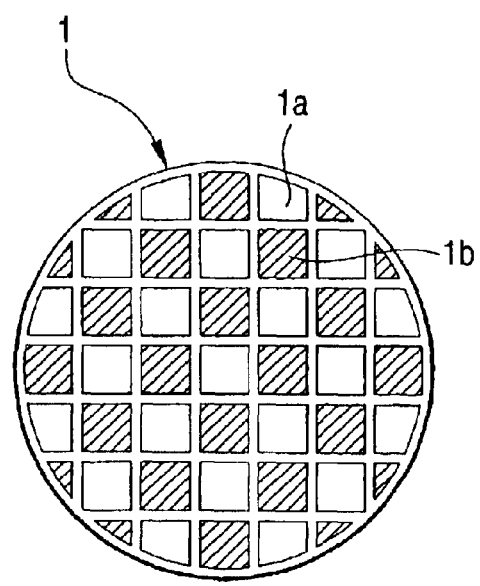
FIG. 3 is a schematic view viewed from Z direction of FIG. 2.
Figure 4:
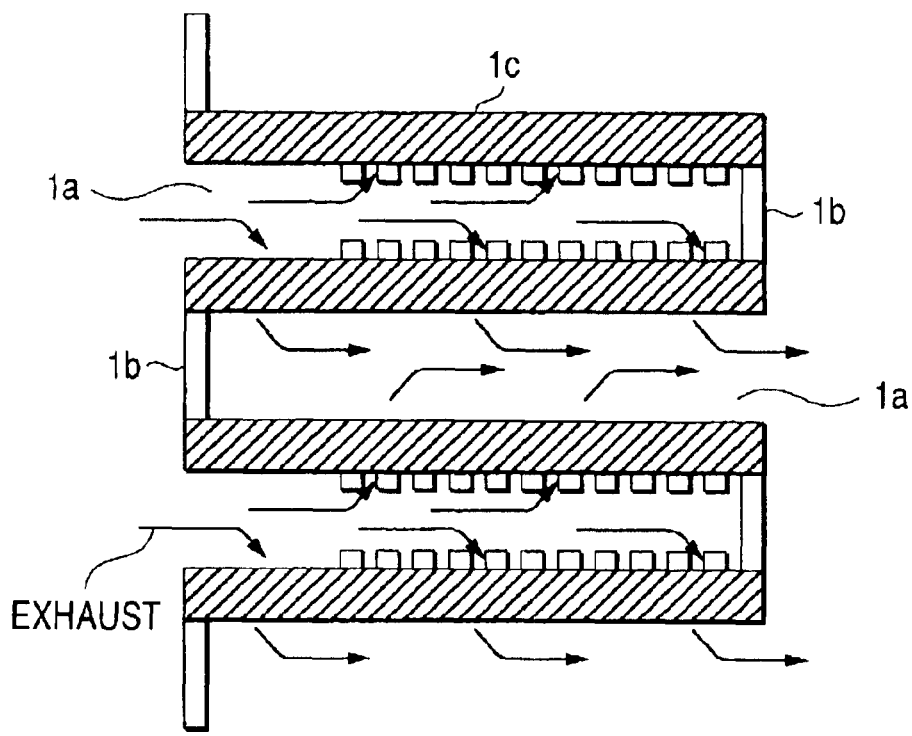
FIG. 4 is a schematic view viewed from X direction of FIG. 2.

As exemplified in FIG. 3, DPF1 of FIG. 2 is arranged with holes 1a and closures 1b alternately and contiguously and formed in checkers as a whole. Further, according to DPF1, as shown by FIG. 4, the holes 1a at one face and the closures 1b at other face are arranged at corresponding positions of DPF1 in the left and right direction. Further, porous partition walls 1c are sandwiched between edges opposed to each other in edges of the closures 1b. The porous partition wall 1c carries an oxidation catalyst. Further, as shown by FIG. 2, a flange portion 1d is provided at an outer periphery of a central portion between left and right faces of DPF1 and can be fastened to an exhaust pipe of a diesel engine, not illustrated, by bolts via a plurality of bolt insertion holes 1e provided at the flange portion 1d. That is, DPF1 is of a reversing type mountable to the engine reversibly.

According to DPF1, as exemplified in FIG. 4, exhaust from the left face as illustrated permeates the porous partition wall 1c and is exhausted from the right face as illustrated. Further, when the exhaust permeates the porous partition wall 1c, PM in exhaust is oxidized (that is, combusted) by the oxidation catalyst to be cleaned thereby.

Figure 1:
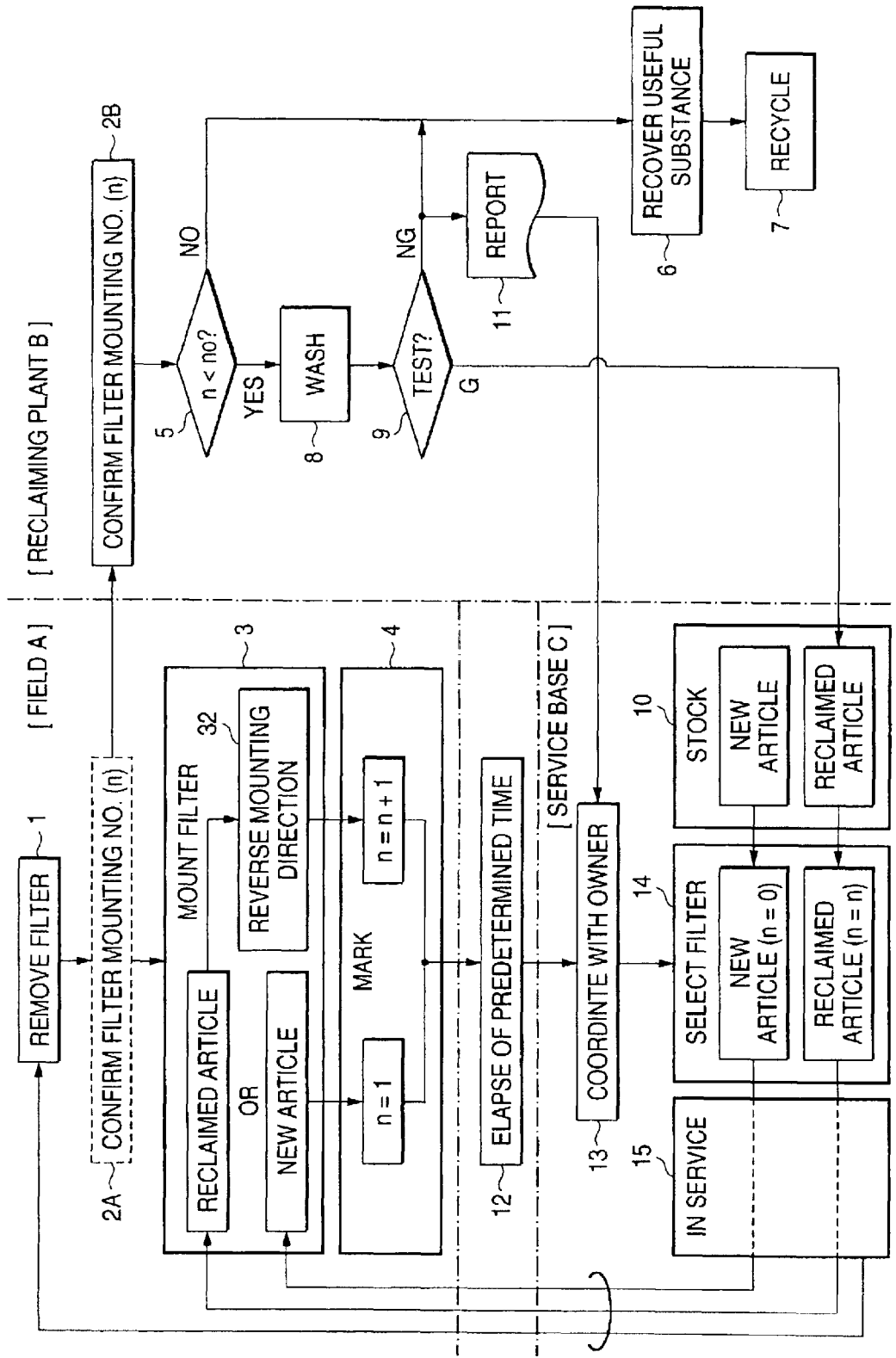
FIG. 1 is a flowchart showing an embodiment according to the invention.

Here, in order to efficiently recover and reuse useful metals included in DPF1, it is preferable to concentratedly carry DPF1 having deteriorated PM catching function into a reclaiming plant, reclaim a reusable one thereof, meanwhile, recover and reuse useful metals by disintegrating a nonreusable one thereof. Hence, according to the embodiment, DPF1 is handled as shown by FIG. 1.

A plurality of service bases C are allocated to one reclaiming plant B. A number of diesel engines are operated in a service territory (field A) of the service base C. Hence, a "contract concerning handling of DPF" is exchanged among the reclaiming plant B, the service base C and engine owners. Thereby, a service engineer in service from the service base C removes DPF1 having a deteriorated PM catching function from the engine of the engine owners in the field A (step 1). At this occasion (or after steps 3 and 4, mentioned later), the service engineer confirms a mark indicating a number of times of mounting n until the occasion of DPF1 provided to the removed DPF1 (step 2A). Further, DPF1 carried to interchange is mounted to the engine (step 3). Further, although the carried DPF1 is either of a new article and a reclaimed article, in either of them, the carried DPF1 is provided with a mark indicating what number of times of mounting number n mounting at a current time corresponds to for the DPF1 (step 4). Specifically, when the new product is marked as "n=1", the recycled article is marked as "n=n+1". Meanwhile, the mark n signifies a mounting direction as described later in details in reference to FIG. 2, mentioned above. Hence, in step 3, when the carried DPF1 is a reclaimed article, the reclaimed article is provided with mark n based on step 4 in mounting at a preceding time and accordingly, the mounting direction in mounting at the preceding time of the reclaimed article can be read from the mark n. Hence, in mounting at the current time, DPF1 can be mounted to the engine in a direction reverse to the mounting direction at the preceding time and mounted in this way (step S32).

After finishing to interchange DPF1, the service engineer records an engine number, owner's name, mark n of removed DPF1, an operation date, engine operation accumulated time (accumulated running distance in the case of a running vehicle) and so on and sends removed DPF1 to the reclaiming plate B along with a copy of the record.

The reclaiming plant B firstly confirms mark n of DPF1 in order to determine whether a number of DPF1 sent from the respective service base C indicates a reusable state (step 2B). Here, mark n indicates mounting number n until removing DPF1. Hence, the reclaiming plant B compares a limit remounting number no previously determined for this kind of DPF1 with mark n (step 5). Further, according to the embodiment, "no=4". Here, "n=0" indicates that DPF1 is an unmounted new article 3, "n=1" indicates a mounted new article and "n=2 through 4" indicates a remounting number n of times of a reclaimed product. Hence, when "n=4" (n=no) in step 5 of executing the comparing determination at the reclaiming plant B, DPF1 is disintegrated and useful matters are recovered (step 6) and reused (step 7). Meanwhile, when "n=1 through 3" (n≠0 and n<no), DPF1 is washed and reclaimed (step 8). Further, it is tested whether reclaiming is carried out excellently (step 9). When the test result is excellent, the DPF 1 is transported to the service base C and stocked at the service base C (step 10). Further, the service base C constituting a destination of transportation needs not to be a source of transportation of the DPF 1. Although there is also a case of constituting "a destination of transportation=a source of transportation" by a contract, the case requires extra time and labor and is disadvantageous in providing inexpensive service. Meanwhile, when the test result is a failure (that is, nonreusable), the test result is reported to the service base C constituting the source of transportation of the DPF1 (steps 11) and the above-described steps 6 and 7 are applied to the DPF1.

As described in step 10, the service base C stocks the reclaimed article 1 transported from the reclaiming plant B as well as the new article 1 at a stock yard (step 10). Further, when a predetermined time (predetermined time period, predetermined number of days) has elapsed since interchanging DPF1 at a preceding time (step 12), the service base C coordinates with the engine owner with regard to in-service time to field A for interchanging DPF in consideration of the contract, the record until the preceding time and the report from the reclaiming plant B (step 13). Based on the result of coordination, the service engineer selects either one of a reclaimed article and a new article (step 14), gets in service to field A by carrying the either one (step 15) and interchanges DPF based on steps 1 through 4, mentioned above. Further, the above-described step 2A may be omitted.

Meanwhile, a specific example of "the mark n constituting the mounting number n signifies the mounting direction", will be explained in reference to FIG. 2.

As mentioned above, DPF1 is of the reversing type. Further, as shown by FIG. 2, the flange portion 1D is previously illustrated with numbers 1 through 4 and ○ marks right therebelow. Hence, when the service engineer mounts the carried DPF1, the service engineer strikes a recessed mark by using a punch or the like at the DPF1 in an order of the numbers 1 through 4 at inside of a ○ mark which is not present from the start. There is made a rule "when DPF1 immediately before being mounted, is provided with the recessed marks up to an odd number (1 or 3) thereof, the DPF1 is mounted by constituting a number describing face thereof as an exhaust side (side of viewing FIG. 2 in Z direction). Further, there is also made a rule "when DPF1 immediately before being mounted is provided with the recessed mark at even number 2 thereof and there is not the recessed mark, the DPF1 is mounted by constituting the number describing face as an intake side (side of FIG. 2 opposed to Z direction)". The above-described rules constitute an operation standard of the service engineer. That is, "the mark n constituting the mounting number n signifies the mounting direction".

Specifically, DPF1 carried for interchanging at steps 3 and 4 is marked with "n=0 through 3". Here, when "n=0, the DPF1 is a new article. In this case, DPF1 is mounted by constituting the number describing face as the intake side and ○ mark of number 1 is punched. Further, when "n=1" or "n=3", the DPF1 is a reclaimed article reclaimed by one time or three times. In this case, DPF1 is provided with one punch mark (recessed mark at number 1) or three thereof (recessed marks respectively at numbers 1 through 3). That is, the mounting direction of DPF1 at a preceding time shows that the number describing face has been disposed on the intake side. Hence, in the mounting direction at current time, DPF1 is mounted by disposing the number describing face on the exhaust side and ○ mark of number 2 or 4 is newly punched. Further, when "n=2", DPF1 is a reclaimed article reclaimed by two times. In this case, DPF1 is provided with two punch marks (recessed marks at numbers 1 and 2). That is, the mounting direction of DPF1 at the preceding time shows that the number describing face has been disposed on the exhaust side. Hence, in the mounting direction at the current time, DPF1 is mounted by disposing the number describing face on the intake side and ○ mark of number 3 is newly punched.

An effect of the embodiment will be described.

(1) Since DPF1 is revertedly mounted in a direction reverse to the mounting direction at the preceding time at each time of remounting, the expected value (service life) of the catching function of remounted DPF1 can be ensured. Further, a time period reaching a nonreusable state is prolonged. That is, useful metals are not wasted and an effect of using DPF is maximally achieved.

(2) Since three parties of the field (engine owner), the service base and the reclaiming plant are united with the service contract as a medium, optimum interchange, concentrated reclaim and concentrated reuse of DPF1 can be achieved and the economic effects are superposed respectively for the three parties. Further, DPF which has been scrapped conventionally despite being reusable, can systematically be reclaimed and remounted by a number of times until the nonreusable state, limited resources can be recovered summarizingly from nonreusable DPF and therefore, there is no waste.

Other embodiments will be exemplified and enumerated as follows.

(1) Although according to the above-described embodiment, numbers 1 through 4 and ○ marks are provided at the flange portion 1d of DPF1, as also illustrated in FIG. 2, the numbers and the ○ marks may be provided on an outer peripheral face of DPF1. Operation and effect thereof are similar to those of the above-described embodiment.

Figure 5:
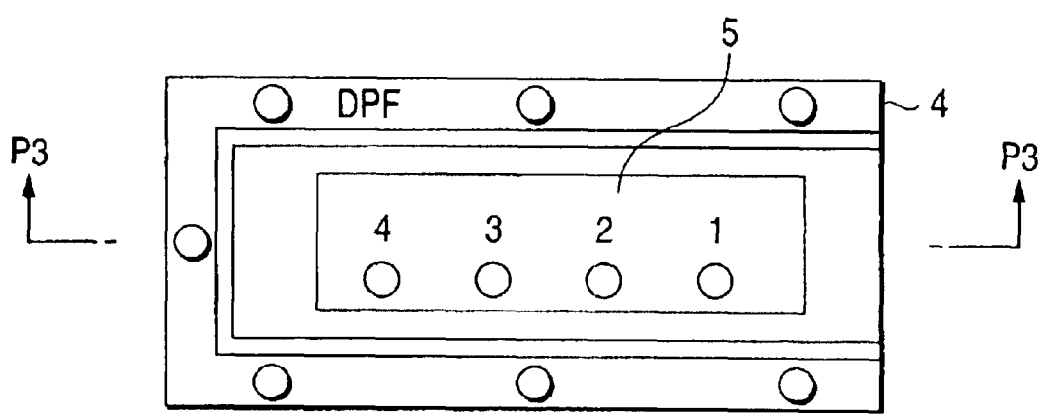
FIG. 5 is a front view of a plate inserting member provided at an observable face and a plate inserted into the member insertably and drawably according to other embodiment.
Figure 6:
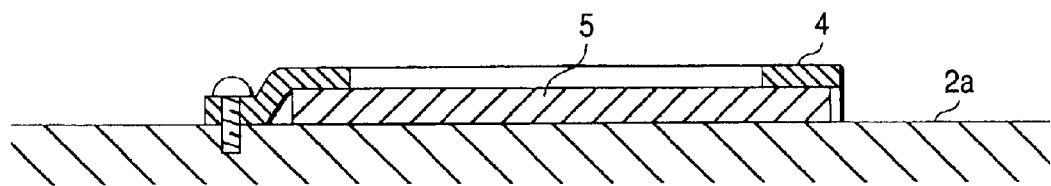
FIG. 6 is a sectional view taken along a line P3-P3 of FIG. 5.
Figure 7:
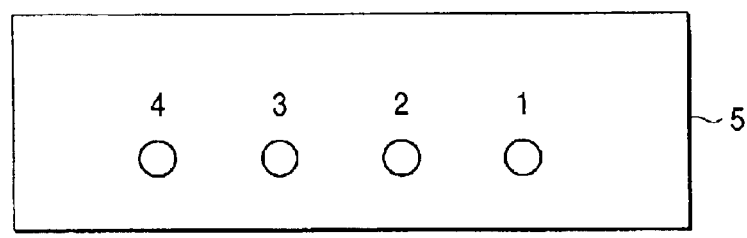
FIG. 7 is a plane view of the plate of FIG. 5.

(2) Although according to the above-described embodiment, numbers 1 through 4 and ○ marks are provided at the flange portion 1d of DPF1 and/or the outer peripheral face of DPF1, in this case, the numbers and the ○ marks may be able to confirm only when DPF1 is somewhat removed. Although a hindrance is not constituted thereby, in order to confirm the numbers and the ○ marks in outlook thereof without removing DPF1, an observable external surface of an engine main body or a machine mounted to the engine maybe marked. FIG. 5 through FIG. 7 shows such as case. An observable external surface 2a is fixedly installed with a plate inserting member 4. The plate inserting member 4 is of a frame structure having a window at its center. Meanwhile, a plate 5 made of aluminum provided with numbers 1 through 4 and ○ marks is prepared. The plate 5 is inserted insertably and drawably to and from the frame of the plate inserting member 4 and numbers 1 through 4 and ○ marks on the inserted plate 5 can be observed from the window. Further, at each time of interchanging DPF, a recessed mark the same as a recessed mark provided to DPF, is provided to ○ mark (punchably). After providing four recessed marks, the plate 5 is replaced by a new one.

(3) Although according to the above-described embodiment, numbers 1 through 4 and ○ marks are provided, recessed marks may be provided by dispensing with these. Because a number of the recessed marks is the mounting number n and for each number, the mounting direction of the carried DPF1 is signified. That is, numbers 1 through 4 and ○ marks can inherently be dispensed with. In the above-described embodiment, provision of numbers 1 through 4 and ○ marks is aimed at avoiding unnecessary erroneous recognition by standardizing marking portions. Further, it is not also necessary to limit the mark to the recessed mark but may be, for example, a painted mark. In sum, painted mark will do so far as the service engineer can grasp the number of times of interchanging, can confirm the mounting directions at the preceding time and/or the current time and can mark the mark.

Figure 8:
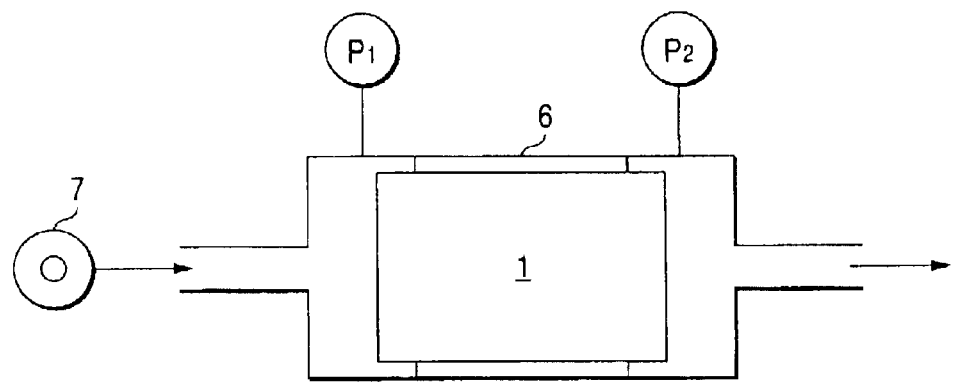
FIG. 8 is a schematic view of a test apparatus of washed DPF.

(4) Although according to the above-described embodiment, the mounting number "n=4" constitutes a reference of determining that DPF is nonreusable, the determination reference differs from a determination reference at the test of step 9 of FIG. 1. Specifically, according to the above-described embodiment, as shown by FIG. 8, the reference is constituted by predetermined fluid pass resistance at DPF1. That is, DPF1 is put into a test box 6, air pressure 7 is applied thereto and front and rear pressure difference Pp (=P1−P2) of DPF1 is measured. Further, when the front and rear pressure reference Pp is out of a value Po in a predetermined range, the DPF1 is determined as nonreusable. Further, although not illustrated, the flow rate Qq of a flow flowing in DPF1 by applying predetermined air pressure, may be measured by a flow rate meter. Also in this case, when the measured flow rate Qq is out of a value of Qo in a predetermined range, the DPF1 is made nonreusable. This is also because DPF1 has been washed and therefore, also in this case, it is shown that the PM catching function of the DPF1 is deteriorated.

What is claimed is:

1. A method of handling a diesel particulate filter wherein:

(1) said diesel particulate filter mounted to a diesel engine for catching particulate matters included in an exhaust gas is reclaimed until being brought into a nonreusable state and remounted to the engine at least by one time; and (2) in mounting the filter, the filter is mounted such that the filter is mounted in a direction reverse to a direction of mounting the filter at a preceding time.

2. A method of handling a diesel particulate wherein:

(1) said diesel particulate filter mounted to a diesel engine for catching particulate matters included in an exhaust gas is reclaimed until being brought into a nonreusable state and remounted to the engine at least by one time;

(2) in mounting the filter, the filter is mounted such that the filter is mounted in a direction reverse to a direction of mounting the filter at a preceding time; and (3) the filter is provided with a mark indicating a mounting direction in remounting the filter at a current time.

3. A method of handling a diesel particulate wherein:

(1) said diesel particulate filter mounted to a diesel engine for catching particulate matters included in an exhaust gas is reclaimed until being brought into a nonreusable state and remounted to the engine at least by one time;

(2) in mounting the filter, the filter is mounted such that the filter is mounted in a direction reverse to a direction of mounting the filter at a preceding time; and (3) it is determined whether the filter is nonreusable by a predetermined number of remounting the same filter.

4. The method of handling a diesel particulate filter according to claim 1 wherein:

(1) it is determined whether the filter is nonreusable by at least either one of a predetermined fluid pass resistance and a predetermined fluid pass flow rate of the filter.

5. A method of handling a diesel particulate filter wherein:

(1) said diesel particulate filter mounted to a diesel engine for catching particulate matters included in an exhaust gas is reclaimed until being brought into a nonreusable state and remounted to the engine at least by one time;

(2) in mounting the filter, the filter is mounted such that the filter is mounted in a direction reverse to a direction of mounting the filter at a preceding time;

(3) the filter is provided with a mark indicating a mounting direction in remounting the filter at a current time; and (4) it is determined whether the filter is nonreusable by a predetermined number of remounting the same filter.

6. A method of handling a diesel particulate filter wherein (1) said diesel particulate filter mounted to a diesel engine for catching particulate matters included in an exhaust gas is reclaimed until being brought into a nonreusable state and remounted to the engine at least by one time;

(2) in mounting the filter, the filter is mounted such that the filter is mounted in a direction reverse to a direction of mounting the filter at a preceding time;

(3) the filter is provided with a mark indicating a mounting direction in remounting the filter at a current time; and (4) it is determined whether the filter is nonreusable by at least either one of a predetermined fluid pass resistance and a predetermined fluid pass flow rate of the filter.

* * * * *